United States Patent [19]
Abbott et al.

[11] 3,845,516

[45] Nov. 5, 1974

[54] LITTER REMOVAL MECHANISM FOR POULTRY HOUSES AND THE LIKE

[76] Inventors: Bennie J. Abbott, Centerville, Tex.; Jeff A. Stroud, Rt. 2, Box 25, Madisonville, Tex. 77864

[22] Filed: Nov. 29, 1972

[21] Appl. No.: 310,219

[52] U.S. Cl. ................................. 15/93 B, 119/22
[51] Int. Cl. ............................................. A01k 31/04
[58] Field of Search ........ 15/93 B; 119/22; 198/224; 214/42, 43; 172/297, 300, 303, 448, 668, 680, 447, 801

[56] References Cited
UNITED STATES PATENTS

| | | | |
|---|---|---|---|
| 3,548,956 | 12/1970 | Hochstetler | 15/93 B |
| 3,605,167 | 9/1971 | Martel et al. | 15/93 B |
| 3,680,166 | 8/1972 | Dyreng | 15/93 B |

FOREIGN PATENTS OR APPLICATIONS

| | | | |
|---|---|---|---|
| 962,945 | 7/1964 | Great Britain | 15/93 B |

Primary Examiner—Harvey C. Hornsby
Assistant Examiner—C. K. Moore

[57] ABSTRACT

A litter removal mechanism for poultry houses and the like comprising a tractor having a rear bumper and scraper guide mechanism supported by the frame work thereof and having a hydraulic lift mechanism incorporated therein. The scraper mechanism, including a pair of spaced scraper blades, is guided by the bumper and scraper guide mechanism and is raised and lowered by the hydraulic lift of the tractor. A blade adjusting mechanism is provided to adjust the lower most scraping height of the scraper. The scraper blade mechanism is articulated to reduce the effective width thereof upon moving the tractor in the reverse direction thereby providing sufficient clearance to facilitate ease of backing the tractor and scraper mechanism into a relatively narrow poultry house during use.

13 Claims, 6 Drawing Figures

3,845,516

LITTER REMOVAL MECHANISM FOR POULTRY HOUSES AND THE LIKE

FIELD OF THE INVENTION

This invention relates generally to scraping mechanisms of the nature generally employed to perform various scraping operations that might be required in connection with a farming operation and more particularly to scraper mechanisms of the type utilized for removing accumulated litter from beneath wire mesh type poultry cages of the nature typically employed for farm operations in connection with egg production.

BACKGROUND OF THE INVENTION

It is common practice to provide wire mesh cages in which egg laying poultry are contained, which cages are typically provided with inclined bottom walls composed of closely spaced wires that serve to support the poultry and conduct laid eggs out of the cages and into an adjacent trough from which the cages can be conveniently gathered. Beneath the cages is typically located a floor composed of a durable surface such as concrete or the like which floor is provided for deposit of litter that falls through the bottom walls of the cages. The cages are particularly contained within long narrow buildings and are arranged in parallel rows with an aisle disposed between the parallel rows. The cages are typically supported in spaced relation from the floor of the building to allow removal of accumulated litter from the concrete floor beneath the cages. The floor space beneath each row of cages is commonly referred to as a "pit" and the usual current practice is to clear and remove the accumulated litter from these pits by a manual operation. After removal, the litter may be prepared for use as fertilizer. Manual removal of the litter from the pits beneath the poultry cages is an extremely laborious and disagreeable task and is sufficiently expensive as to seriously detract from the profits of an egg producing operation.

THE PRIOR ART

In view of the difficulty and expense associated with manual litter removal operations, a number of devices have been developed to facilitate mechanical litter removal. Tractors have been fitted with scraper blades specifically designed for removal of litter from the pits beneath the poultry cages (U.S. Pat. Nos. 3,160,141 Crutchfield; 2,970,567 Rubin; 3,066,341 Becker; and 3,548,956 Hochstetler). The poultry cages may be supported within the buildings in such manner that the space beneath the cages is unobstructed to allow mechanical removal of accumulated litter, such as shown by U.S. Pat. No. 2,946,309 to Page.

During litter removal operations it may be necessary to back a tractor type scraper mechanism into a poultry house, adjust the scraper mechanism for a scraping operation and to move forwardly in such manner as to remove a small amount of the accumulated litter. One disadvantage found in most tractor type scraper mechanisms is the inability of the blade mechanisms to be adjusted for reduction in overall width during backing operation, thereby making such backing operation of the tractor extremely difficult to accomplish and possibly resulting in damage to the building structure. Also, because of the lightweight nature of most tractor type scraper mechanisms, designed for poultry litter removal operations, it is difficult to provide a hydraulic lift mechanism that is capable of supporting relatively heavy scraper blade mechanisms during scraping operations.

Another disadvantage of tractor type scraper mechanisms for poultry litter removal operations is the inability of the scraper blade to be accurately adjusted relative to the tractor in such manner that efficient litter removal operations can be conducted.

Accordingly, it is a primary object of the present invention to provide a novel tractor type scraping mechanism for poultry litter removal operations incorporating scraper blade mechanisms that automatically reduce an effective overall width during backing operation thereby facilitating ease of backing the scraper mechanism into a poultry house.

It is another object of this invention to provide a novel tractor type scraper mechanism for poultry litter removal operations that may be raised and lowered by a hydraulic lift mechanism and may be supported in the scraping position thereof by simple mechanical support means to eliminate unnecessary wear and tear on the hydraulic lift mechanism of the tractor.

Among the several objects of the present invention is noted the contemplation of a novel tractor type scraping mechanism for poultry litter removal operations, and the like, which tractor mechanism employs a scraper blade mechanism that may be accurately adjusted relative to the tractor to provide efficient scraping operations.

It is also an object of the present invention to provide a novel tractor type scraper mechanism for conducting poultry litter removal operations, which tractor mechanism may be of small and light-weight nature to facilitate use within relatively small and narrow poultry houses and which tractor mechanism will not have any tendencies to become overloaded during such scraping operations.

It is an even further object of the present invention to provide a novel tractor type scraper mechanism for conducting poultry litter removal operations which employes a conventional light-weight tractor such as a garden tractor and incorporates a scraper mechanism that is in the nature of an attachment for the tractor mechanism and may be quickly and easily installed or removed as desired.

Still another feature of this invention includes the provision of a novel tractor type scraper mechanism for poultry litter removal operations, which mechanism is of inexpensive nature, is reliable in use and is low in cost.

Other and further objects, advantages and features of the present invention will become apparent to one skilled in the art upon consideration of the written specification, the attached claims and the annexed drawings. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may comprise a vehicle mechanism such as a garden tractor, or the like, provided with front and rear wheels and having a framework to which may be fixed a rear bumper assembly. The garden tractor mechanism may incorporate an implement lift, such as a hydraulic lift assembly. A scraper blade mechanism may be movably received by a plurality of guide elements fixed to the bumper assembly and may be operatively connected to the implement lift mechanism, thereby allowing the scraper mechanism to be raised and lowered by the implement lift. The scraper mechanism may be provided with a pair of spaced scraper blade assemblies that are separated by a distance slightly greater than the width of the rear wheels of the tractor mechanism. Each of the blade assemblies may be pivotally connected to a centrally located blade connecting assembly and may be movable between a collapsed position, where the effective width of the scraper assembly is reduced to allow backing of the tractor into a poultry house, and an operative position, where the scraper assembly is expanded to its full working dimension to achieve full width scraping operations. The scraper mechanism is constructed for automatic movement to the collapsed position thereof upon backing of the tractor and is automatically expandable to the operative position thereof upon forward movement of the tractor.

Any one of a number of suitable mechanical devices such as chains, mechanical stops, bolts or the like may be employed to establish the lowermost or scraping position of the scraper blade mechanism, thereby allowing the implement lift to be lowered to its lowermost position, during scraping operations, and thereby allowing the lift mechanism to be substantially inoperative when the scraper blade mechanism is disposed in the lowermost scraping position thereof. This feature protects the lift mechanism from undue wear and tear.

The scraping mechanism may also be provided with vertical adjustment means that may be simply and easily adjusted to accurately position the scraper blade relative to the tractor mechanism and relative to the floor of the poultry house to facilitate accurate scraping operations.

The scraper mechanism is in the form of an attachment for a small light-weight tractor, such as a garden tractor or the like, and may be easily assembled and disassembled from the tractor mechanism as desired.

BRIEF DESCRIPTION OF THE DRAWINGS

So that the manner in which the above recited features, advantages and objects of the present invention, as well as others, which become apparent, are attained and can be understood in detail, more particular description of the invention, briefly summarized above, may be had by reference to the embodiment thereof, which is illustrated in the appended drawings, which drawings form a part of this specification.

It is to be noted however that the appended drawings illustrate only a typical embodiment of the invention and are therefore not to be considered limiting of its scope, for the invention may admit to other equally effective embodiments.

IN THE DRAWINGS

Figure 1:
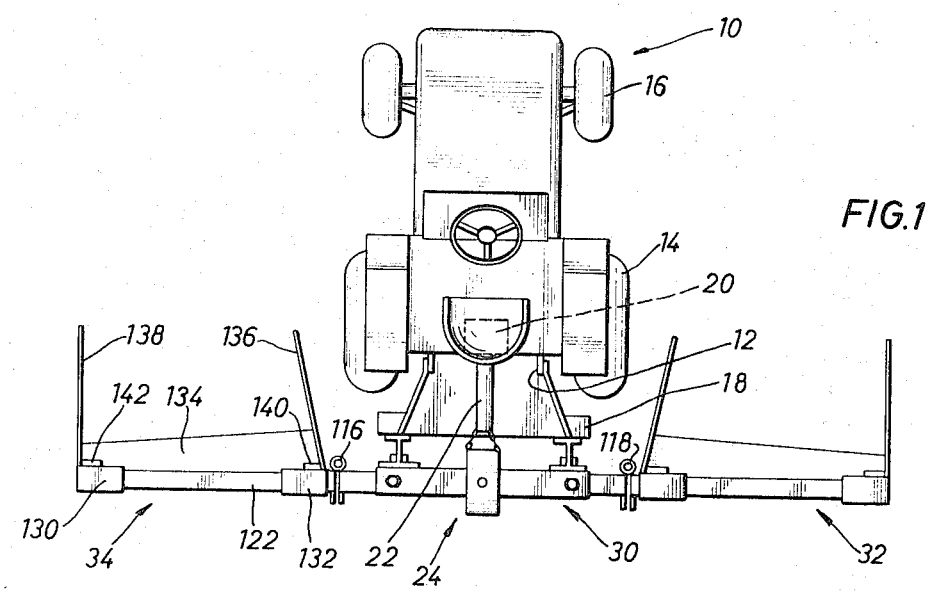

FIG. 1 is a pictorial representation in plan view of a tractor mechanism having a scraper mechanism attached thereto, which scraper mechanism is constructed in accordance with the present invention and is disposed in the operative scraping position thereof.

Figure 2:
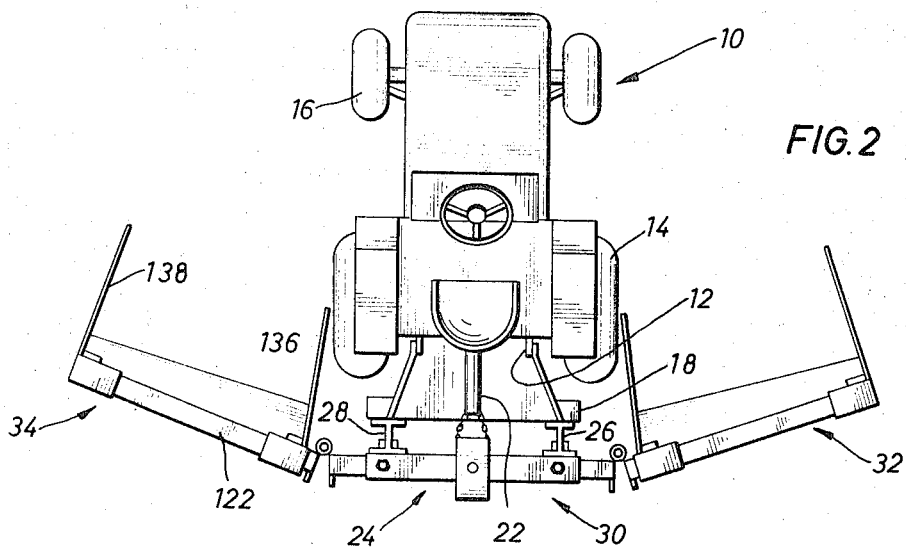

FIG. 2 is a pictorial representation in plan view of the scraper mechanism of FIG. 1 with the scraper blade mechanism being illustrated in the collapsed position thereof.

Figure 3:
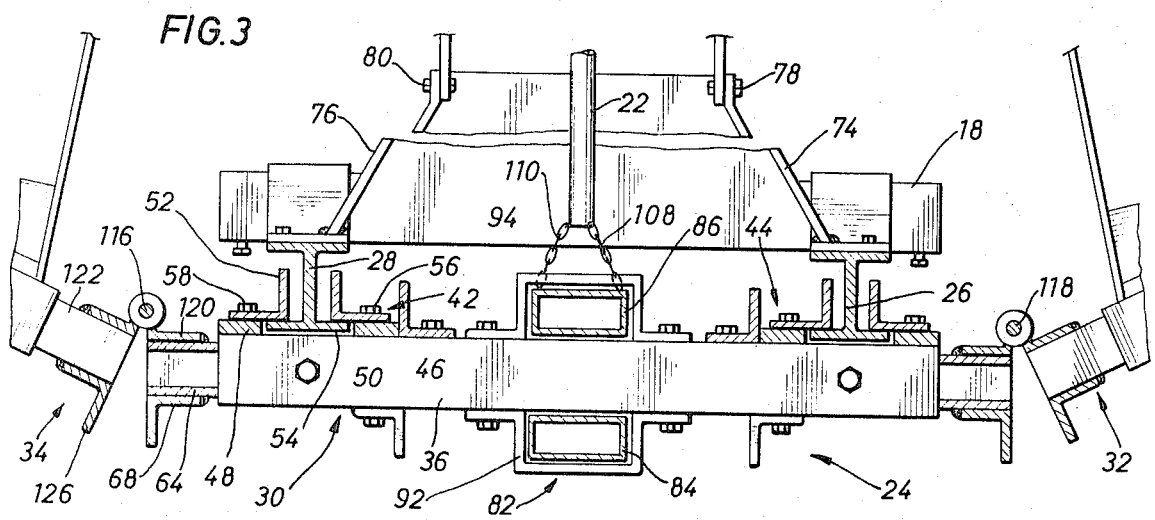

FIG. 3 is a fragmentary plan view of the scraper mechanism of FIGS. 1 and 2 having parts thereof broken away and shown in section and specifically illustrating connection of the scraper assembly to the implement lift of the tractor mechanism as well as illustrating the structural connection of the scraper mechanism to the bumper assembly of the tractor.

Figure 4:
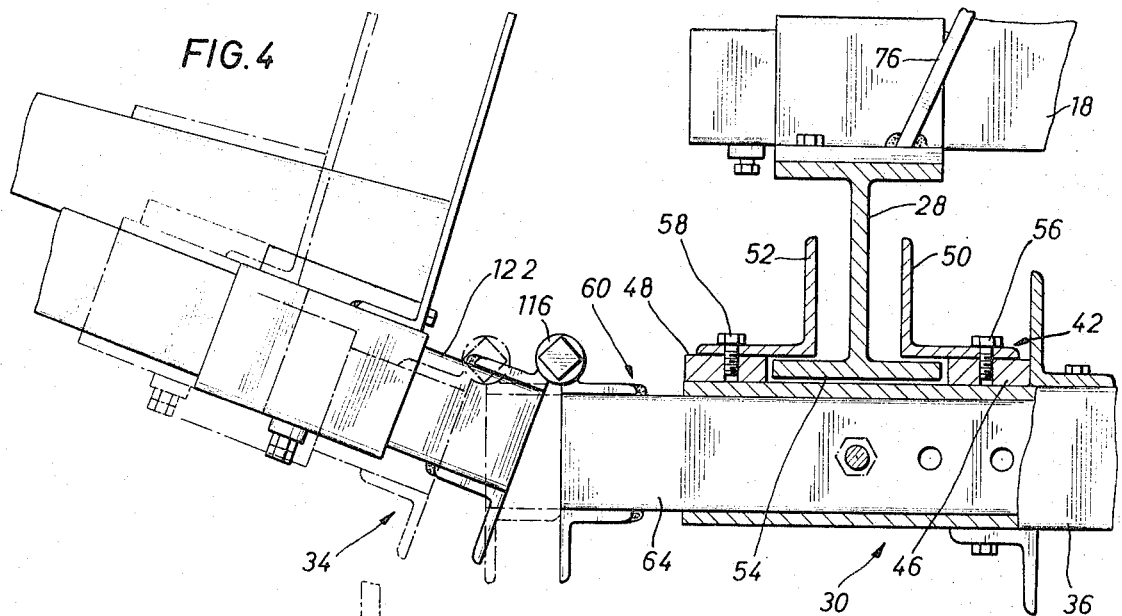

FIG. 4 is a fragmentary plan view having parts thereof broken away and shown in section, and specifically showing the connection structure that allows vertical movement of the blade mechanism relative to the tractor frame structure, showing the structure for lateral adjustment of the blades and showing the hinge connection that allows partial collapsing of the scraper blade mechanism during backing of the tractor.

Figure 5:
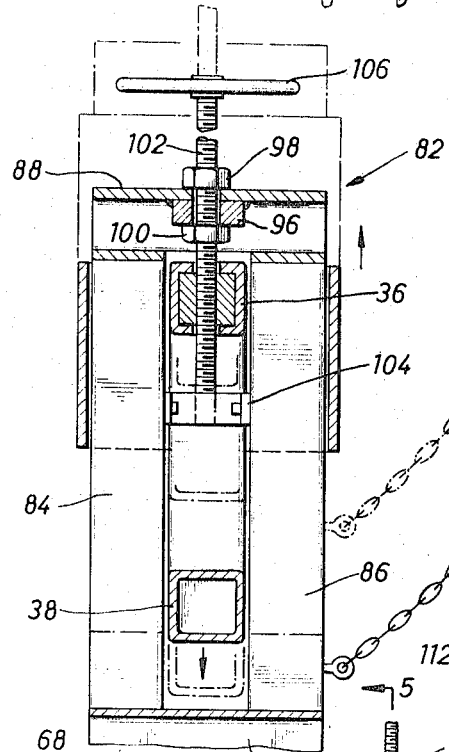

FIG. 5 is a fragmentary elevational view having parts thereof broken away and shown in section and specifically illustrating the mechanism for vertical adjustment of the scraping position of the scraper mechanism and for support of the scraper mechanism during scraping operations.

Figure 6:
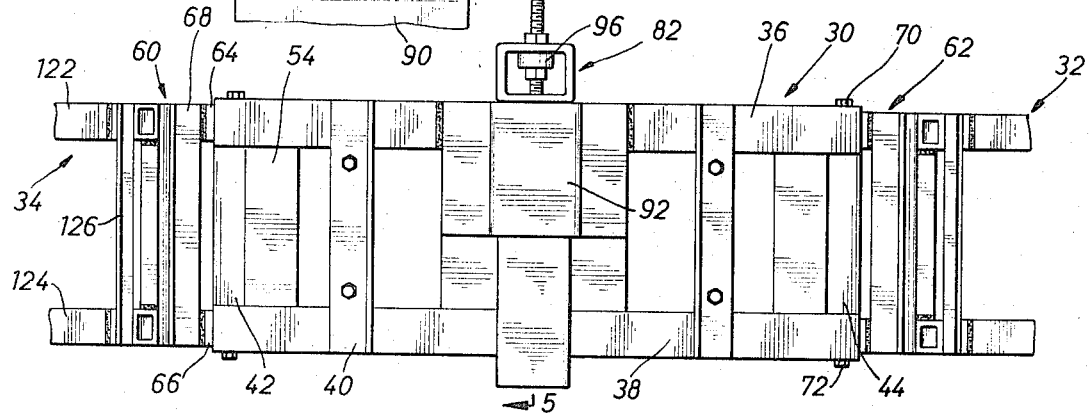

FIG. 6 is a fragmentary plan view of the scraper mechanism illustrating the specific construction of the scraper blade support frame structure of the scraper blade assembly.

DESCRIPTION OF PREFERRED EMBODIMENT

Referring now to the drawings and first to FIG. 1 there is pictorially illustrated, generally at 10, a tractor mechanism which may be a small light-weight tractor such as a garden or lawn tractor or the like. The tractor mechanism is provided with a frame 12 supporting the rear wheel assembly 14 and the front wheel assembly 16 of the tractor assembly. A rear bumper assembly 18 may also be fixed to the frame 12 of the tractor assembly. The tractor may also be provided with an implement lift illustrated in broken lines at 20 from which may extend a lift arm 22 to which any suitable implement may be connected, thereby allowing the tractor mechanism to selectively raise and lower the implement as desired.

For the purpose of removing accumulated litter from a floor beneath spaced parallel rows of poultry cages, it may be desirable to provide scraper apparatus that is adapted to simultaneously remove accumulated litter from the floor beneath both parallel rows of poultry cages. Such scraper apparatus may conveniently take the form illustrated generally at 24 in FIGS. 1 and 2 where a pair of vertical guide elements 26 and 28 are fixed to the horizonally disposed bumper 18. While the vertical guides are illustrated as being connected to the bumper element by welding, it is considered obvious that any other suitable means of connection such as bolting, for example, may be employed to affix the vertical guide elements to the bumper assembly.

As depicted pictorially in FIGS. 1 and 2 the scraper assembly may incorporate a centrally disposed support frame, illustrated generally at 30 to which may be pivotally connected spaced scraper assemblies shown generally at 32 and 34. As illustrated in FIGS. 3, 5 and 6, the support frame 30 may include a pair of spaced horizonal supports 36 and 38 respectively that may be maintained in spaced relation by structural spacer elements 38 and 40 and by structural spacer and guide assemblies shown generally at 42 and 44.

Each of the spacer and guide assemblies may incorporate spacer plates 46 and 48 as shown in detail in FIG. 4 that serve to maintain angular guide elements 50 and 52 in spaced relation with the horizonal support elements 36 and 38, thereby providing a vertical guide space within which may be received the transverse flange portion 54 of the vertical guide element 28. For practical purposes the vertical guide element 28 may be in the form of a simple I-beam, while the spacer elements 46 and 48 may conveniently take the form of simple elongated rectangular bars of any suitable metal, such as steel. The angular guide structures 50 and 52 may conveniently take the form of simple commercially available 90° angle structures, which may also be composed of any suitable metal, such as steel, for example. The guide members and the spacer members may be retained in assembly with the horizonal support elements 36 and 38 by means of bolts 56 and 58, or in the alternative, the guide and spacer elements may be secured to the horizonal support structures by any other suitable means of connection, such as by welding, for example.

The angular guide members 50 and 52 are maintained by the bolts 56 and 58 in spaced relation, thereby allowing the central web portion of the vertical guide 28 to extend freely therebetween. By these cooperating structures, there is defined a generally T-shaped slot, that is of slightly larger dimension than the web and transverse flange portions of the I-beam type vertical guide element 28. The guide element 28 therefore is freely received within the vertical T-shaped slot and the support frame 30 therefore is freely vertically movable relative to the I-beam type guide elements 26 and 28.

Because of the differences in dimension that might be found in poultry houses of slightly different construction, it may be desirable to provide slightly more or less spacing between the scraper blade assemblies. Accordingly, one suitable means for adjusting the spacing of the scraper blade assembly may conveniently take the form illustrated in FIGS. 1 and 2, where the horizontal support elements 36 and 38 are shown to be of hollow retangular tubular construction, thereby adapting the same for telescopically receiving open ended scraper support frames illustrated generally at 60 and 62 respectively. Each of the support frames includes spaced parallel support elements 64 and 66 that may be interconnected by a transverse support element 68 that may be either connected to the horizontal supports 64 and 66 or formed integrally therewith, as desired. The horizontal support elements 64 and 66 are telescopically received within the spaced horizontal support elements 36 and 38 and are fixed relative thereto by bolt elements 70 and 72 that extend through appropriate threaded apertures formed within the respective horizontal support elements.

When it becomes appropriate to adjust the width of the scraper blade assemblies 32 and 34, the bolts 70 and 72 may be removed from the horizontal support elements thereby freeing the support frames 60 and 62 and allowing the frames to be telescopically adjusted relative to the support frame 30. The bolts 70 and 72 then may be reinserted within aligned adjustment apertures in the horizontal support elements to secure the support frames 60 and 62 in fixed relation with the support frame 30. The scraper blade assemblies 32 and 34, therefore, may be readily adjusted simply by removing the bolts 70 and 72 and by reinstalling such bolts subsequent to telescopic adjustment of the support frames 60 and 62.

It is desirable that the support frame 30 and thus the scraper blade assemblies 32 and 34 be structurally supported for retention in substantially horizontal relation with the floor from which the litter is to be removed. One suitable means for retaining the support frame 30 in substantially horizontal manner, may conveniently take the form illustrated in FIG. 3, where a pair of support arms 74 and 76 are shown to be connected to the support frame 30 by welding or the like. In the free extremities of the support arms 74 and 76 may be formed pivot apertures through which may extend bolts 78 and 80 respectively that also extend through apertures formed in the frame structure 12 of the tractor assembly and thereby support the support frame 30 in pivotal relation with the frame of the tractor structure. The support arms 74 and 76 therefore retain the support frame 30 in substantially horizontal relation relative to the tractor structure, but allow vertical movement of the support frame relative to the guide elements 26 and 28 of the tractor structure.

It will be desirable to provide means for vertically reciprocating the support frame 30 and thereby accomplish raising and lowering of the scraper blade assemblies during operation of the scraper mechanism. To accomplish such reciprocation, it will be convenient to structurally interconnect the arm 22 of the implement lift 20 to the support frame 30 in such manner that reciprocation of the lift arm 22 will also cause reciprocation of the support frame 30 and the scraper assemblies 32 and 34, connected thereto. One suitable means of establishing structural interconnection between the support frame 30 and the lift arm 22 of the implement lift, may conveniently take the form illustrated in FIGS. 3 and 5 where a lifting and adjustment yoke generally shown at 82 is disposed in generally transverse relation to the support frame 30. The yoke 82 may incorporate a pair of generally parallel vertical elements 84 and 86 that may be maintained in fixed spaced relation by upper and lower transverse elements 88 and 90 that may be fixed to or formed integrally with the vertical elements 84 and 86. The cooperating vertical elements 84 and 86 and horizontal elements 88 and 90 define a generally rectangular frame-work having a rectangular opening within which the support frame 30 may be adjustably positioned as desired.

Upper and lower pairs of generally U-shaped guide elements, such as illustrated at 92 and 94 in FIG. 3, may be fixed to the horizontal support elements 36 and 38 by bolting, as shown, or by any other suitable means of connection. The vertical parallel elements 84 and 86 are received, respectively, within the guide openings defined by the guide elements 92 and 94 and thereby provide for vertical movement of the support frame relative to the yoke and the support frame 30.

The support frame 30 may be adjusted minutely by an adjustment mechanism illustrated particularly in FIG. 5. To the upper portion of the upper transverse element 88 may be secured a spacer element 96 by welding or the like that also has the effect of strengthening the upper transverse element in the area where the adjustment structure is to be connected thereto. The spacer element 96 will be provided with an aperture disposed in alignment with an aperture formed in the upper surface of the upper transverse element 88. Upper and lower nut elements 98 and 100, respectively, may be secured to the transverse element 88 and to the spacer element 96 by welding or the like. The nut elements 98 and 100 are disposed to receive a threaded adjustment stem 102 that extends through the upper horizontal element 36 and is connected by a transverse connector device 104 to the vertical elements 84 and 86 of the yoke structure. A hand-wheel 106 may be fixed in any desirable manner to the upper extremity of the threaded actuating stem or jack screw 102 and may be rotated in order to impart rotation to the actuating stem and achieve vertical adjustment of the support frame 30. The particular structure, including nut elements 98 and 100 and spacer element 96 is not to be considered limiting as regards the present invention, it being obvious that other threaded drive structures may be conveniently employed for establishing sufficient threaded drive connection between the support frame and the yoke to achieve vertical adjustment of the support frame and the scraper mechanisms carried thereby.

As illustrated in FIG. 5, the implement lift arm 22 will extend to the vicinity of the scraper blade support frame. To establish connection between the frame and the implement lift arm 22, a pair of chains 108 and 110, defining a lifting or supporting bridle, may be connected by bolting or by any other suitable connection means to the support arm 22 and may be connected to support elements 112, in the form of eye bolts, that may be affixed adjacent the lower extremity of the yoke. Although it may be practical to adjust the scraper blades by means of a hydraulic lift assembly, or other lift structure, as explained above, most small lawn or garden type lift equipped tractors do not utilize lifts of sufficient durability for supporting and adjusting a relatively heavy scraper framework of the nature ordinarily utilized. It may be desirable therefore to allow the lift structure of the tractor to support the scraper mechanism only during movement of the scraper blade mechanism to the scraping position thereof. During scraping operations, it may be practical to lower the hydraulic lift to its lowermost position where the scraper blade mechanism may be supported by simple mechanical support structure rather than by the lift mechanism.

The lowermost position of the hydraulic lift mechanism may be set by manually adjusting the handwheel 106 to raise or lower the horizontal framework to position the scraper blades in proper scraping position when the hydraulic lift is in its lowermost position. It will not be necessary, therefore, to adjust the position of the scraper mechanism relative to the surface to be scraped each time the lift mechanism is lowered for a scraping operation. This feature makes efficient use of the operator's time by eliminating the necessity for frequent adjustment and also eliminating the necessity of supporting the scraper mechanism by the implement lift. When the implement lift mechanism is bottomed out, by lowering the arm 22 to the FIG. 5 position thereof, the scraper mechanism will be supported by the mechanical structure of the tractor solely through the lift arm 22 and the chain bridle defined by chains 108 and 110. If desired, a stop element 114 may be provided on the tractor structure for engagement by the implement lift arm 22 at the lowermost position thereof, thereby further insuring against utilization of the implement lift structure as the sole support for the scraper mechanism.

As discussed above, poultry houses are frequently very narrow structures and it is desirable that a scraper mechanism employed therein be capable of collapsing during backing of a tractor mechanism into the poultry house in order to facilitate ease of the backing operation. When moving the tractor forward, during a scraping operation, it is desirable that the scraper blades be positioned as wide as is necessary to achieve optimum full width scraping to insure that substantially all of the litter is removed during a single pass scraping operation. One convenient means for accomplishing collapsing of the scraper mechanism for easy entry into a poultry house, may conveniently take the form illustrated particularly in FIGS. 1 and 2 and shown in detail in FIGS. 3 and 4, where convenient hinge structures 116 and 118 are provided to establish connection between the horizontal framework structure and the scraper blade assemblies 32 and 34. As shown in detail in FIGS. 3 and 4, the hinge structure 116 is provided with opposed support flanges 118 and 120 that may be pivotally secured by the hinge structure and may be fixed to the horizontal support structure and the scraper blade mechanism by welding or the like. The hinge 116 as well and the hinge 118, may be single elongated hinge devices extending the vertical length of the horizontal support frame or, in the alternative, one or more hinges may be vertically oriented in order to establish proper hinged connection between the horizontal support frame and the scraper blade mechanisms. As shown in FIG. 6, each of the scraper mechanisms may employ a pair of generally horizontal structural elements 122 and 124 and a hinge may be welded to each of the structural elements and to opposed elements 64 and 66 of the horizontal support frame. A spacer element 126, in the form of an angular structural element, may be employed to affix the parallel structural elements 122 and 124 in proper relative position and to strengthen the scraper mechanism in the area of the hinged connection.

As the tractor is being moved forwardly, resistance between the scraper blades 32 and 34 and the material being scraped from the floor of the poultry building, will cause the scraper blades to move to the position illustrated in FIG. 1, where the structural support portion of the blades are substantially aligned in coextensive manner with the horizontal support frame. The hinges 116 and 118 will be moved to a position allowing the structural element 68 and 126 to move into substantial abutment.

When it is desired to back the tractor into a poultry house, resistance between the surface to be scraped and the blade structures, assuming the blade structures to be lowered to the scraping position thereof, will cause the blades to pivot to the FIG. 2 position thereof about the hinges 116 and 118. When the scraper blades have moved thusly, the implement lift can be actuated, thereby raising the scraper blade mechanism sufficiently to clear the deposit of litter on the surface to be scraped. When the blades have moved to the collapsed position thereof, as illustrated in FIG. 2, there will be sufficient clearance between the scraper blades and the walls of the building to allow the scraper mechanism to be quite easily received within the building. The implement lift then may be actuated to the lowermost or scraping position thereof.

As shown in FIGS. 1, 2 and 4, each of the scraper mechanisms includes a pair of horizontally disposed upper and lower structural elements 122 and 124 to which may be secured scraper blade brackets 130 and 132 providing support for a scraper blade 134 and inner and outer material guide elements 136 and 138. Vertical structural elements 140 and 142 provide structural support to maintain the upper and lower parallel elements 122 and 124 in substantially parallel relation. The opposite scraper blade mechanism 32 is substantially a mirror image of the blade mechanism 34.

In view of the foregoing, it is readily apparent that I have provided a novel scraper mechanism for small tractors such as lawn tractors, garden tractors and the like, that may be effectively utilized to remove litter from concrete floors or other surfaces above which poultry cages are located. The unique structure of my scraper mechanism effectively reduces the width of the scraper mechanism as it is backed into a poultry house and automatically increases the width of the scraper mechanism upon moving the scraper mechanism forwardly during a scraping operation. This feature effectively allows a tractor carrying a scraper mechanism constructed according to my invention to be backed easily into a poultry house where scraping operations or litter removal may be accomplished in a single scraping pass.

My invention also effectively utilizes the capability of a lift mechanism, such as a hydraulic lift for example on small lawn or garden tractors without subjecting the lift mechanism to excessive wear and tear that might otherwise occur if the lift mechanism were utilized to support the scraper mechanism in all positions of use thereof. My scraper mechanism also may be lowered to a proper operative position thereof simply by lowering the lift mechanism to its lowermost or bottomed out position. If minute adjustment of the scraper mechanism is necessary, such can be accomplished simply by manual manipulation of an adjustment structure with which the scraper mechanism is provided. Once the proper operative position is set, by means of the adjustment mechanism, it will not be necessary for the operator to adjust the vertical positioning of the lift mechanism to insure proper scraping. The lift mechanism may be simply lowered to the lowermost position thereof which automatically sets the blade of the scraper mechanism at the proper scraping position thereof.

My invention also facilitates minor adjustment to compensate for differences in the physical size of various poultry houses. Lateral adjustment means is provided that will effectively allow proper spacing of the opposed scraper mechanisms to insure optimum removal of accumulated litter from poultry houses of various size.

In view of the foregoing, it is readily apparent that I have provided a novel scraper mechanism that is effective to accomplish all of the objects hereinabove set forth together with other objects that may be inherent from the description of the apparatus itself.

I claim:

1. A litter removal mechanism for poultry houses and the like comprising:

a vehicle mechanism provided with front and rear wheels, having a rear bumper assembly and having an implement lift;

a support framework being movably retained by said bumper assembly and being operatively connected to said lift;

a pair of scraper blades being pivotally supported one at either extremity of said support framework, said scraper blades being pivotally movable by ground resistance force applied to said scraper blades during scraping movement of said vehicle mechanism from an operative laterally extended position of said blades where said blades are substantially coextensive with said support framework, to a collapsed position by inertia developed upon movement of said vehicle in an opposing direction where said blades are disposed in angulated relation with said support framework and the effective width of the scraper blades and support framework assembly is reduced;

an adjustment yoke being supported in immovable relation with said implement lift;

jack screw means being threadedly received by said adjustment element and being connected to said support framework, said jack screw means being rotatable to impart vertical movement to said support framework relative to said implement lift.

2. A litter removal mechanism as recited in claim 1:

scraper guide means being carried by said bumper assembly of said vehicle mechanism; and
said support framework being guided by said guide means during raising and lowering thereof.

3. A litter removal mechanism as recited in claim 1:

adjustment means for adjustable presetting the lowermost scraping position of said support framework, said scraping position being assumed upon movement of said implement lift to the lowermost position thereof.

4. A litter removal mechanism as recited in claim 1:

generally vertically oriented guide means being fixed to said bumper assembly;
guide receiving means provided on said support framework receiving said guide means and maintaining alignment of said support framework during raising and lowering movement thereof; and
said adjustment yoke being manipulatable for adjustably establishing the lowermost scraping position of said support framework, said scraping position being assumed upon movement of said implement lift to the lowermost position thereof.

5. A litter removal mechanism as recited in claim 1:

generally vertically oriented guide means being provided by said bumper assembly; and
said support framework having guide receiving means for receiving said guide means and guiding said support framework as said support framework is moved generally vertically relative to said bumper assembly.

6. A litter removal mechanism as recited in claim 5:

a pair of spaced guide bars having one extremity thereof pivotally connected to said vehicle and the opposite extremity thereof fixed to said support framework, said guide bars maintaining generally horizontal positioning of said support framework as it moves up and down relative to said bumper assembly.

7. A litter removal mechanism as recited in claim 1:

said implement lift raising and lowering said support framework relative to the scraping position thereof; and means for mechanically supporting said support framework at said scraping position independently of said implement lift.

8. A litter removal mechanism for poultry houses and the like, comprising:

a vehicle mechanism provided with front and rear wheels, having a rear bumper assembly and having an implement lift having raised and lowered limits of travel;

generally vertical guide means provided on said rear bumper assembly;

a support framework being disposed in generally horizontal position;

a pair of scraper blades each being pivotally connected to opposite extremities of said support framework and being movable by inertia about said pivotal connections to a collapsed position thereof to reduce the effective width of the scraper blades upon backing of said vehicle mechanism and being pivotally movable by scraping resistance to fully extend said scraper blades to the maximum effective width thereof upon forward movement of said vehicle mechanism;

guide receiving means being defined by said support framework and receiving said guide means to guide said support framework during vertical movement relative to said bumper assembly;

means connecting said support framework to said implement lift to allow said implement lift to raise and lower said scraper blades relative to a scraping position thereof, said scraping position being assumed upon movement of said implement lift to the lowermost position thereof;

means for mechanically supporting said support framework and said scraper blades at said scraping position independently of said implement lift;

an adjustment yoke being provided on said support framework for adjusting the scraping position of said scraper blades and being supported in immovable relation with said implement lift; and jack screw means being threadedly received by said adjustment yoke and being connected to said support framework, said jack screw means being rotatable to impart vertical movement to said support framework relative to said implement lift, said scraping position being assumed upon movement of said implement lift to the lowermost position thereof.

9. A litter removal mechanism as recited in claim 8:

said implement lift including an implement lift arm;

said means for mechanically supporting said scraper blades comprising at least one connecting element interconnecting said support framework with said implement lift arm; and stop means carried by said vehicle mechanism and being engaged by said implement lift arm at the lowermost position thereof, said stop means supporting said implement lift arm, said support framework and said scraper blades upon movement of said lift arm to the fully lowered position thereof.

10. A litter removal mechanism as recited in claim 8:

means for adjusting the width of said support framework to thereby adjust the spacing of said scraper blades.

11. A litter removal mechanism as recited in claim 8:

a pair of spaced guide bars being pivotally connected at one extremity thereof to said vehicle and being fixed at the opposite extremities thereof to said support framework, said guide bars maintaining generally horizontal positioning of said support framework and said scraper blades as said support framework is raised and lowered relative to said rear bumper assembly by said implement lift.

12. A litter removal mechanism as recited in claim 8:

said support framework having a pair of movably related frames, one being connected to said implement lift and defining said guide receiving means and the other of said frames carrying said scraper blades; and a vertical adjustment structure interconnecting said frames and being selectively movable to adjust the relative positioning of said frames and thereby to adjust the scraping position of said scraper blades.

13. A litter removal mechanism as recited in claim 12:

said vertical adjustment structure being an elongated threaded screw element being rotatably carried by one of said frames; and internally threaded means being provided on the other of said frames and threadedly receiving said threaded screw whereby rotation of said screw will impart relative vertical movement to said frames.

* * * * *